C. B. LAWLER, W. A. BRYAN & J. KELLER.
CAR SEAL.
APPLICATION FILED AUG. 8, 1911.
1,010,925.
Patented Dec. 5, 1911.
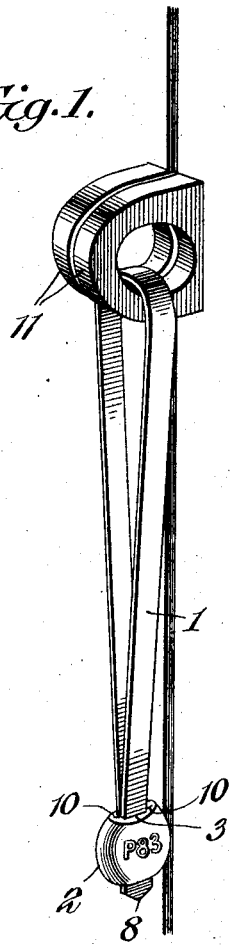
Fig. 1.
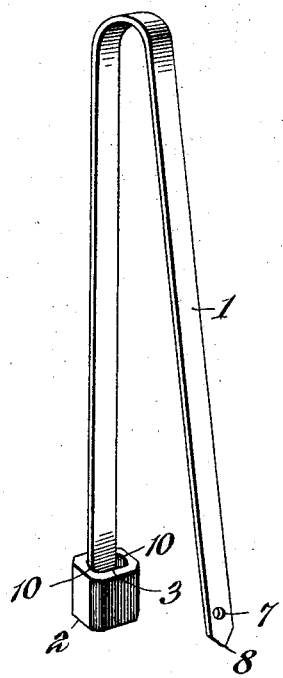
Fig. 2.
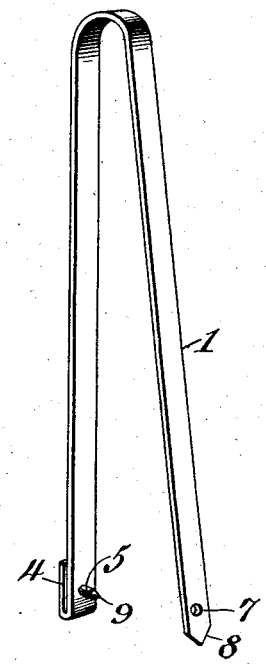
Fig. 3.
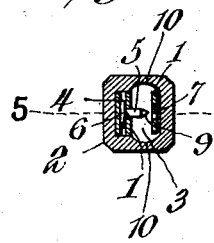
Fig. 4.
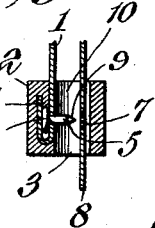
Fig. 5.
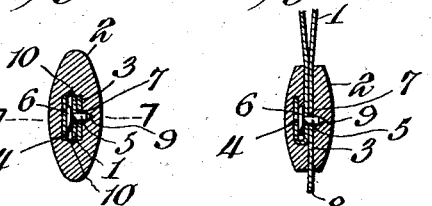
Fig. 6. Fig. 7.
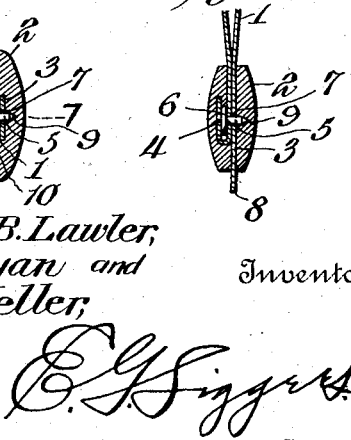
Witnesses
Howard D. Orr.
F. T. Chapman
Claude B. Lawler,
W. A. Bryan and
John Keller,
Inventors,
By
Attorney
COLUMBIA PLANOGRAPH CO., WASHINGTON, D. C.

UNITED STATES PATENT OFFICE.

CLAUDE B. LAWLER, WILLIAM A. BRYAN, AND JOHN KELLER, OF AMARILLO, TEXAS.

CAR-SEAL.

1,010,925.   Specification of Letters Patent.   Patented Dec. 5, 1911.

Application filed August 8, 1911. Serial No. 642,964.

*To all whom it may concern:*

Be it known that we, CLAUDE B. LAWLER, WILLIAM A. BRYAN, and JOHN KELLER, citizens of the United States, residing at Amarillo, in the county of Potter and State of Texas, have invented a new and useful Car-Seal, of which the following is a specification.

This invention has reference to improvements in car seals and its object is to provide a car seal which cannot be tampered with without giving evidence of such tampering, and cannot be broken and afterward restored to so close a semblance to the original condition as to hide the fact of tampering, and, moreover, it is a further object of the present invention to provide a car seal which may be very cheaply constructed and which will permit the use of sealing irons such as are at present employed.

The invention will be best understood from a consideration of the following detailed description taken in connection with the accompanying drawings forming a part of this specification, with the understanding, however, that the drawings illustrate but one practical embodiment of the invention and as the invention is susceptible of various modifications and changes it is not limited to the exact showing of the drawings.

In the drawings:—Figure 1 is a perspective view of the seal completed and in position to secure two fastening members against malicious separation. Fig. 2 is a perspective view of the seal structure ready for application. Fig. 3 is a perspective view of the strap ready for the application of the lead body. Fig. 4 is a cross section of the complete seal structure with the loose end of the strap in place, the section traversing the rivet or pin and the lead body. Fig. 5 is a section on the line 5—5 of Fig. 4. Fig. 6 is a section similar to Fig. 5 but showing the lead body impressed into sealing condition. Fig. 7 is a section on the line 7—7 of Fig. 6.

Referring to the drawings, there is shown a long, narrow thin strip 1 which may be made of some flexible material, such as tin, or any metal suited for the purpose, and in use this strip 1 is bent intermediately and its free ends are secured together by a sealing body 2 of lead or any other suitable metal, lead being the most commonly used material for the purpose, and, therefore, for convenience of description the sealing body will be referred to as a lead body, with the understanding that the invention is not thereby limited to the use of lead only. The body 2 is initially formed with a passage 3 therethrough and one end of the strip 1 is made permanently fast to the body 2, the latter being usually molded to such end of the strip 1, and when the parts are assembled for sealing purposes the other end of the strip 1 is passed through the passage 3 of the body 2 and the latter is compressed to obliterate the passage 3 and bring its walls into contact with the inserted strip forced against the permanently secured strip end. To this extent the structure of the present invention does not depart to any material degree from some forms of car seals as heretofore made.

In the car seal of the present invention one end of the strip 1 has a return bend 4 and adjacent the bend the strip is perforated for the passage of the shank of a pin 5 having a head 6 lodged between the main portion of the corresponding end of the strip 1 and the return portion 4, so that the pin is effectually locked to the end of the strip and projects from the same laterally with relation to the length of the strip from that face of the strip remote from the return portion 4. The other end of the strip may be formed with a perforation 7 and at the extremity be brought to a point 8, although neither the perforation 7 or the point 8 are mandatory. The free end of the shank of the pin 5 may be pointed, as indicated at 9, but the pointing of the pin is also not mandatory, for the pin will pass through the perforation 7 even if not pointed, but if the perforation 7 be omitted then the pointed end 9 of the pin 5 will facilitate the perforating of the end of the strip remote from that carrying the pin under circumstances to be described. After the pin has been lodged in one end of the strip as described, then the lead body 2 is formed about this end of the strip, the said body being customarily molded or cast on the end of the strip, or even compressed thereon, lead or similar metal readily flowing into conformity with and matching the end of the strip carrying the pin 5, and the parts are so disposed that the pin 5 will project into the passage 3 transverse to the length thereof, and this passage 3 is of such size that the pin will not reach the opposite wall from that matching the part of the strip 1 carrying the pin, but sufficient space is left for the insertion of the other end of the strip, so that such end of the strip may extend through the passage 3 and beyond the body 2 if such be desired.

While it is not mandatory, it is preferred to make the passage 3 of greater lateral extent in a plane parallel with the face of the strip from which the pin 5 projects than in line with the pin, and the passage preferably has the ends in the line of the longer diameter concaved, as indicated at 10 in Figs. 2 and 4. The contour of the body 2 is not material.

When it is desired to secure two parts together, as, for instance, two car doors or a car door to a fixed portion of the car body, the parts to be secured together may be considered as represented by two staples 11 shown in Fig. 1, but these members 11 are to be taken as simply typical of any parts to be secured together and at times the seal may be used simply to traverse a passage in a lock or fastening member in such manner that the lock or fastening member can not be moved to the unlocked position without the removal of the seal structure.

Considering the sealing device of the present invention as reaching the user either in the form shown in Fig. 2 or with the strip 1 straightened, such strip is readily passed through the staples 11 or whatever passage the strip is to traverse and the free end of the strip is readily inserted into the passage 3 when the perforation 7 can without difficulty be brought into coincidence with the free end of the pin 5, this being facilitated by having the pin 5 pointed, as indicated at 9, although the end of the pin may be blunt and still the perforation 7 may be quite readily positioned to be moved on to the pin. The pointed extremity 8 of the free end of the strip 1 facilitates the introduction of this end of the strip into the passage 3, but it will be understood that the pointed extremity is not mandatory and may be omitted especially if the longer diameter of the passage 3 is sufficiently larger than the width of the strip to permit some side displacement of the free end of the strip with relation to the end carrying the body 2.

The strip 1 is quite flexible and may be readily bent so that the free end has a normal tendency toward the end carrying the body 2, wherefore when the free end of the strip is inserted in the passage 3 it will tend to move toward the other end of the strip, so that the perforation 7 is traversed by the pin 5 because of the elastic tendency of the free end of the strip. Now, if a sealing iron be applied on opposite sides of the body 2 in a direction to force the walls of the body 2 toward the flat faces of the ends of the strip, the pin 5 is forced through the perforation if not already projecting therethrough and is embedded in the metal of the bulb beyond the strip and the two ends of the strip are brought into engagement with all parts within the compass of the body 2 effectually embedded therein, and, moreover, the exterior of the body 2 being entirely free from any hard metal parts, the character matrices of the sealing iron are readily introduced into the soft metal of the body 2 without interference, while the metal will expand because of the concave end walls of the passage 3 until the passage is practically obliterated and the material of the body 2 is brought into close contact at all points except where prevented by the presence of the ends of the strip 1. In this way there is produced a most effective seal which cannot be tampered with without showing evidence of such tampering. The body 2 must be expanded to nearly its original shape before the initially free end of the strip can be removed from the pin 5 and any attempt to restore the body 2 to its first position would leave unquestionable evidence of such attempt at tampering, or even an unsuccessful attempt at tampering with the seal will leave unquestionable evidence thereof. The initially free end of the strip 1 cannot be withdrawn from the compressed sealing body by a slight expansion of such body to be replaced in such manner as to deceive one making but a casual inspection as is possible with seals in common use.

It has been stated that the perforation 7 is not mandatory, but if this perforation be omitted then the pointed end 9 of the pin 5 will readily perforate the free end of the strip under the pressure applied by the sealing iron, or if in the act of applying the device the perforation 7 is not brought into proper coincidence with the pin 5, then the pointed end thereof will perforate the metal of the free end of the strip 1 at one side of the perforation 7. In any event the pin 5 will traverse the free end of the strip 1 and become embedded in the body 2. Furthermore, the return portion 4 of the corresponding end of the strip maintains the pin 5 always in the initially projected position and it cannot be displaced from its first position by any pressure applied by the sealing iron, and, also, it is held against lateral displacement with relation to the end of the strip carrying it by the head 6 and return 4.

The pin 5 is made of some hard unyielding material such as iron or steel and is therefore non-collapsible, so that it is not affected by the pressure applied by the sealing irons.

It is obvious that the end of the strip with the return portion 4 may be initially wholly embedded in the corresponding part of the body 2 and that the free end of the strip beyond the perforation 7 may be of such length as to also be wholly embedded or inclosed in the body 2 when the latter is compresed by the sealing operation.

What is claimed is:—

1. A car seal comprising a long, thin narrow metallic strip having one end returned on itself, a pin having a head portion lodged between the end of the strip and the return portion thereof with the shank portion projecting through the strip and beyond the face thereof remote from the return portion, and a sealing body of compressible material carried by and embedding the end of the strip having the return portion, said sealing body being formed with an interior passage into which the pin projects and adapted to receive the other end of the strip, whereby on compressing the sealing body the pin will traverse the second named end of the strip and embed in the material of the sealing body without disturbing the relation of the pin to the end of the strip carrying it.

2. A car seal comprising a long, narrow metallic strip having one end returned on itself and within the range of the return portion carrying a headed pin with the head lodged between the return portion and the adjacent portion of the end of the strip and the shank extending through and beyond the strip toward the face thereof remote from the return portion, and the other end of the strip having a perforation therethrough adapted to be traversed by the shank of the pin, and a sealing body of suitable material carried by the end of the strip having the return portion and embedding said return portion of the strip with the shank of the pin extending into the passage through the sealing body, the shank of the pin being adapted to traverse the perforation in the other end of the strip when the said other end of the strip is lodged within the sealing body and the material of the latter is compressed to bring the two ends of the loop into contact.

3. A car seal comprising a long, narrow strip of metal having one end returned on itself with a non-collapsible headed pin extending through the said end of the strip with the shank projecting from that face of the strip remote from the return portion and the head lodged between the return portion and the adjacent face of the strip, the free end of the pin being pointed, and a sealing body with a passage therethrough and embedding the end of the strip with the return loop with the pin projecting into the passage.

4. A car seal comprising a long, narrow strip of metal having one end returned on itself, a headed pin having a shank portion traversing the said end of the strip with the head lodged between the return portion and the corresponding face of the strip, and a sealing body having a passage therethrough and embedding the return portion of the strip and head of the pin with the shank of the pin extending into the passage through the sealing body, the said passage having the walls on opposite sides of the pin concaved.

5. A car seal comprising a long, narrow strip of metal having one end returned on itself, a headed pin having a shank portion traversing the said end of the strip with the head lodged between the return portion and the corresponding face of the strip, and a sealing body having a passage therethrough and embedding the return portion of the strip and head of the pin with the shank of the pin extending into the passage through the sealing body, the said passage having the walls on opposite sides of the pin concaved and the end of the strip remote from that carrying the pin being provided with a perforation for the passage of the pin.

6. A car seal comprising a long, narrow metal strip having one end returned on itself and the other end provided with a pointed extremity and a perforation adjacent said extremity, a headed pointed pin having the head lodged between the return portion of the corresponding end of the strip and the face of the strip adjacent thereto and the shank portion extending through the strip beyond the face thereof remote from the return portion, and a sealing body having a passage therethrough with two opposite walls concaved and between these walls embedding the end of the strip having the return portion with the pin projecting into said passage.

In testimony, that we claim the foregoing as our own, we have hereto affixed our signatures in the presence of two witnesses.

CLAUDE B. LAWLER.
WILLIAM A. BRYAN.
JOHN KELLER.

Witnesses:
W. L. MOLYNEAUX,
DAVID DERDEN.

---

Copies of this patent may be obtained for five cents each, by addressing the "Commissioner of Patents, Washington, D. C."